United States Patent Office 2,925,403
Patented Feb. 16, 1960

2,925,403

NEW POLYEPOXIDES FROM EPOXY-SUBSTITUTED CYCLOALIPHATIC ALCOHOLS, THEIR PREPARATION AND POLYMERS

Edward C. Shokal, Walnut Creek, Calif., assignor to Shell Development Company, New York, N.Y., a corporation of Delaware No Drawing. Application May 29, 1956
Serial No. 587,960

18 Claims. (Cl. 260—47)

This invention relates to a new class of polyepoxides and to a method for their preparation. More particularly, the invention relates to new polyepoxides derived from epoxy-substituted cycloaliphatic alcohols, to a method for their preparation and to the utilization of the new polyepoxides, particularly in the preparation of pottings and castings and in the preparation of improved coating compositions.

Specifically, the invention provides new and particularly useful polyepoxides comprising ethers of (1) alcohols having a vic-epoxy group contained in a cycloaliphatic ring, and (2) monohydric alcohols possessing one or more vic-epoxy groups. These new polyepoxides are preferably prepared by etherifying an alcohol having an ethylenically unsaturated cycloaliphatic ring, such as, for example, 2-cyclohexenol, with a vic-epoxy-substituted alcohol, such as, for example, glycidol, and then treating the resulting ether with a peroxidizing agent to convert the ethylenic group in the cycloaliphatic ring to an epoxy group.

The invention further provides cured products obtained by reacting the above-described new polyepoxides with epoxy curing agents, such as amines, polybasic acid anhydrides, $BF_3$ and its complexes, metal salt catalysts and the like.

It is an object of the invention to provide a new class of polyepoxides and a method for their preparation. It is a further object to provide new polyepoxides from alcohols possessing an ethylenically unsaturated cycloaliphatic ring. It is a further object to provide new aliphatic polyepoxides which possess low viscosities. It is a further object to provide new non-aromatic polyepoxides which have a high degree of reactivity with epoxy curing agents, such as amines and anhydrides. It is still a further object to provide new non-aromatic polyepoxides which have epoxy groups having different rates of reactivity with epoxy curing agents. It is a further object to provide new non-aromatic polyepoxides which can react with a curing agent through one epoxy group and then cross-linked with a different curing agent through the remaining epoxy groups. It is a further object to provide new non-aromatic polyepoxides which can be cured to form hard resistant castings. Other objects and advantages of the invention will be apparent from the following detailed description thereof.

It has now been discovered that these and other objects may be accomplished by the new polyepoxides of the present invention which comprise ethers of (1) alcohols having a vic-epoxy group contained in a cycloaliphatic ring, and (2) monohydric alcohols possessing one or more vic-epoxy groups. These new polyepoxides have been found to possess many new and unexpected properties due to their unique structural features. It has been found, for example, that these new polyepoxides possess surprisingly low viscosity and can be used as such without addition of diluents. In fact, most of the new polyepoxides have such low viscosity that they may be used as diluents themselves for other types of polyepoxides, such as the commercially available glycidyl ethers of polyhydric phenols. It has also been found that these new polyepoxides having high activity toward epoxy curing agents, such as amines, anhydrides, $BF_3$ and $BF_3$ complexes, can be used therewith to form very hard resistant products. This was quite unexpected as previously prepared polyepoxides having the epoxy group in an internal position, such as, for example, epoxidized triglycerides, have been very slow to react with epoxy curing agents, such as amines.

It has been further found, and this represents a special feature of the invention, that the new polyepoxides prepared from the epoxy-substituted cycloaliphatic alcohols and vic-epoxy-substituted alcohols wherein the epoxy group is in a position other than on a cycloaliphatic ring, and preferably in a terminal position, such as

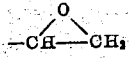

represent a very special group of compounds in that they have epoxy groups of different activity toward epoxy curing agents. Thus, the epoxy group on the cycloaliphatic ring has been found to be less reactive with active epoxy curing agents, such as amines, than the terminal epoxy groups, so one may first react the new polyepoxides with an amine to form a long chain polymer through reaction with the terminal epoxy group and then this polymer can be cross-linked through the epoxy group on the cycloaliphatic ring by reaction with other epoxy curing agents, such as acid anhydrides.

The new polyepoxides of the present invention are preferably prepared by reacting an alcohol having an ethylenically unsaturated cycloaliphatic ring, such as, for example, 2-cyclohexenol, with an epoxy halide like epichlorohydrin followed by reaction with alkali to form the vic-epoxide and then treating the resulting ether with a peroxidizing agent to convert the ethylenic group in the cycloaliphatic ring to an epoxy group. As to this process of preparation, it was surprising to find that epoxidation of the unsaturated linkage in the cycloaliphatic ring could be accomplished without affecting the epoxy group in the radical attached through the ether linkage. Further, while ethylenic groups, such as —C—C=C, have been rather difficult to epoxidize, the ethylenic group in the cycloaliphatic ring of the present compounds has been rather easy to epoxidize.

As noted above, the novel polyepoxides of the invention may be described as ethers of alcohols having a vic-epoxy group contained in a cycloaliphatic ring and monohydric alcohols possessing one or more vic-epoxy groups. The expression "vic-epoxy" as used herein refers to the group

i.e., wherein the oxygen atom is attached to vicinal carbon atoms. The notation that the vic-epoxy group is contained in a cycloaliphatic ring indicates that the carbon atoms of that group are part of the ring itself. The alcohols possessing the vic-epoxy-substituted cycloaliphatic rings may be monohydric or polyhydric, may possess a ring of 5, 6 or 7 carbon atoms, and may have the alcohol OH group attached directly to the ring or through an alkylene group of preferably not more than 7 carbon atoms. Examples of these alcohols include, among others, 2,3-epoxycyclohexanol, 2-methyl-3,4-epoxycyclohexanol, 2-methoxy-3,4-epoxycyclohexanol, 2,3-epoxycyclopentanol, 2-methyl-3,4-epoxycyclopentanol, 3,4-epoxycycloheptanol, 3-(2,3-epoxycyclohexyl)-methanol, 2-(2,3-epoxycyclopentyl)ethanol, 2,2-bis(2,3-epoxycyclohexyl)-propanol, and the like. Particularly preferred are the epoxy-substituted cycloalkanols and the epoxycycloalkylalkanols containing not more than 12 carbon atoms.

The vic-epoxy-substituted monohydric alcohols, ethers of which are provided by the present invention, may be any aliphatic or cycloaliphatic monohydric alcohol which possesses one or more vic-epoxy groups in an internal or terminal, and preferably a terminal position. Examples of these monohydric alcohols include, among others, any of the above-described epoxy-substituted cycloaliphatic alcohols as well as 2,3-epoxypropanol (glycidol), 3,4-epoxybutanol, 2,3-epoxybutanol, 2,3-epoxyhexanol, epoxidized octadecadienol, epoxidized dodecadienol, epoxidized tetradecadienol, 3,4-epoxydihydropyran-5-propanol, 2,3-dimethyl-4,5-epoxyoctanol, 2-methoxy-4,5-epoxyoctanol, 3,4-epoxy-5-chlorocyclohexanol, 2,3-epoxypropoxypropanol, 2,3-epoxypropoxyhexanol, 4-(2,3-epoxypropoxy)heptanol, 2,3-epoxydodecanol and the like.

Preferred epoxy-substituted alcohols are the epoxy-substituted aliphatic and cycloaliphatic monohydric alcohols containing from 3 to 15 carbon atoms, such as 2,3-epoxypropanol, 2,3-epoxycyclohexanol, epoxycyclohexylmethanol, 3,4-epoxybutanol, 3,4 - epoxydodecanol, 2-methyl-2,3-epoxypropanol, 3-butyl-2,3-epoxycyclohexanol, 2,3-epoxypropoxyethanol, 2,3-epoxypropoxyoctanol, and the like. Particularly preferred epoxy-substituted alcohols are the epoxyalkanols, epoxyalkoxyalkanols, epoxycycloalkanols, epoxycycloalkylalkanols, epoxycycloalkanoxyalkanols, epoxyalkoxycycloalkanols and epoxycycloalkylalkoxyalkanols and particularly those containing no more than 12 carbon atoms.

Coming under special consideration are the vic-epoxy-substituted alcohols wherein the epoxy group is not contained in a cycloaliphatic ring but is in a straight chain portion of the molecule, and preferably in a terminal position, such as the alcohols of the formula

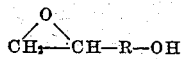

wherein R is a bivalent aliphatic hydrocarbon radical. As noted above, ethers prepared from these special epoxy alcohols present epoxy groups that have different activity toward curing agents and the epoxy group in the cycloaliphatic ring. These special properties enable them to be used to form higher molecular weight products before cross-linking as indicated hereinafter.

Examples of the novel ethers of the present invention include, among others 2,3-epoxypropyl 2,3-epoxycyclohexyl ether, 3,4-epoxybutyl 2,3-epoxycyclohexyl ether, 2,-3-epoxypropyl 2,3 - epoxycyclopentyl ether, 2,3-epoxypropyl 3,4-epoxycycloheptyl ether, 2,3-epoxypropyl (2,3-epoxycyclohexyl)methyl ether, 2,3 - epoxypropyl (2,3-epoxycyclohexyl)propyl ether, 3,4 - epoxydodecyl 2,3-epoxycyclohexyl ether, the diether of 2,3-epoxycyclohexanol and ethylene glycol, the diether of 2,3-epoxycyclopentyl and butylene glycol, the diether of 2-methyl-3,4-epoxycyclohexanol and 1,5-pentanediol, the diether of 2,3-epoxycyclopentanol and sulfonyldipropanol, the triether of 2,3-epoxycyclohexanol and glycerol, di(2,3-epoxycyclohexyl) ether, 2,3-epoxypropoxypropyl 2,3-epoxycyclohexyl ether, 2,3-epoxypropyl 2,3,5,6-diepoxycyclohexyl ether and 2,3-epoxypropyl 2,3-epoxy-5-chlorocyclohexyl ether and the like.

Preferred polyepoxides of the present invention include the epoxyalkyl, epoxycycloalkyl, epoxyalkoxyalkyl and epoxycycloalkoxyalkyl ethers of epoxycycloalkanols or epoxycycloalkylalkanols, such as, for example, 2,3-epoxypropyl 2,3-epoxycyclohexyl ether, di(3,4-epoxycyclohexyl) ether, 2,3-epoxypropoxybutyl 2,3-epoxycyclohexyl ether, 2,3-epoxypropyl (2,3-epoxycyclohexyl)butyl ether, 2,3-epoxycyclohexyloxymethyl 2,3-epoxycyclohexyl ether.

As noted above, the particularly preferred polyepoxides, particularly because of their variable activity toward curing agents are those ethers of the epoxycycloalkanols and epoxycycloalkylalkanols wherein the other epoxy groups are in the terminal position, such as, for example, 2,3-epoxypropyl 2,3-epoxycyclohexyl ether, 3,4-epoxybutyl 2,3-epoxycyclohexyl ether, 2,2-epoxypropyl (2,3-epoxycyclohexyl)butyl ether and 2,3-epoxydodecyl 2,3-epoxycyclopentyl ether.

The novel compounds of the invention may be prepared by a variety of methods. They may be prepared, for example, by epoxidizing the corresponding polyethylenically unsaturated ether, i.e., an ether of an alcohol having an ethylenically unsaturated cycloaliphatic ring and a monohydric alcohol possessing an ethylenic group. 2,3-epoxypropyl 2,3-epoxycyclohexyl ether may be prepared by this method, for example, by epoxidizing allyl 2-cyclohexenyl ether. The polyethylenically unsaturated ethers may be prepared by conventional methods from the unsaturated alcohols. Thus, allyl 2-cyclohexenyl ether may be prepared by reacting allyl chloride with 2-cyclohexenol in the presence of NaOH. Di(2-cyclohexenyl) ether of ethylene glycol may be prepared by this method, for example, by reacting 2 moles of 2-cyclohexenyl alcohol with 1 mole of ethylene dichloride in the presence of 2 moles of NaOH. This type of etherification reaction is preferably conducted at temperatures ranging from about 50° C. to 100° C. Solvents are not generally used if excess of the proper reagent is used but may be employed if desired or necessary.

Polyepoxides of the present invention wherein the epoxy group in the vic-epoxy-substituted monohydric alcohol is in the 2,3-position are preferably prepared by first reacting the ethylenically unsaturated cycloaliphatic alcohol with a halo-epoxy-substituted compound or a dihalo-hydroxy-substituted compound in the presence of a condensation catalyst to form a chlorohydrin ether, dehydrochlorinating that product to form the epoxy ether and then epoxidizing the ether to convert the ethylenic group in the cycloaliphatic ring to an epoxy group. 2,3-epoxypropyl 2,3-epoxycyclohexyl ether may be prepared by this method, for example, by reacting 2-cyclohexenol with epichlorohydrin to form the chlorohydrin ether of 2-cyclohexenol, dehydrochlorinating that product to form the glycidyl ether and then treating the resulting product with a peracid to effect the epoxidation of the ethylenic group in the cyclohexenyl ring.

The expression halo-epoxy-substituted compound as used herein refers to those compounds having a 1,2-epoxy group, i.e., a

group attached directly to a halogen-bearing carbon atom, such as, for example, epichlorohydrin, epibromohydrin, 1,4-dichloro-2,3-epoxybutane, 1-chloro-2,3-epoxypentane, and the like. The expression dihalo-hydroxy-substituted compound as used herein refers to those compounds having a series of three carbon atoms one of which is attached to a halogen atom, the next is attached to a hydroxyl group and the last is attached to a halogen atom, such as, for example, 1,3-dichloro-2-hydroxypropane, 2,4-dibromo-3-hydroxypentane, 2,3-dichloro-3-hydroxybutane, and the like. Epichlorohydrin comes under special consideration because of its low cost and because of the superior properties of the epoxides obtained therefrom.

The halo-epoxy-substituted compound or the dihalo-hydroxy-substituted compound and the unsaturated cycloaliphatic alcohols are preferably reacted in chemical equivalent ratios varying from about 1:1 to 1.5:1. As used herein, "chemical equivalent" amount as used in references to these reactants refers to the amount of the reactants needed to furnish one mole of the halo-epoxy-substituted compound or dihalo-hydroxy-substituted compound for every OH group of the alcohol molecule to be reacted.

The reaction between the unsaturated cycloaliphatic alcohol and the epoxy-forming material is effected in the presence of a condensation catalyst, such as acid-type catalyst including HF, $H_2SO_4$, $H_3PO_4$, salts such as $SnCl_4$ and $BF_3$ ether complexes. The concentration of the catalyst will vary depending upon the individual catalyst.

In general, the catalysts are employed in amounts varying from about .1% to about .5% by weight of the reactants. The catalysts, such as BF₃ complexes, are preferably employed in amounts varying from about .1% to about 1% while the catalysts, such as SnCl₄, are preferably used in amounts varying from about .5% to about 4%, as indicated in U.S. 2,260,753 and U.S. 2,380,185.

The condensation may be effected in the presence or absence of solvents or diluents. In most cases, it is preferred to employ a solvent, such as cyclohexane, benzene, and the like.

Temperatures generally range from about 25° C. to 150° C., and more preferably between 50° C. and 120° C. In general, the higher temperatures give darker products and are less preferred than the lower temperatures.

The condensation may be carried out in a variety of ways. The two reactants may be mixed at room temperature and the catalyst then added, or the catalyst may be added to one reactant and the other reactant added to that mixture.

The chlorohydrin product obtained by the above reaction is then treated with an alkaline material to dehydrohalogenate the product. This treatment may be accomplished by adding the alkaline material to the reaction mixture obtained in the above described process, or the condensation product may be recovered from the reaction mixture by any suitable means, such as distillation, extraction, and the like, before it is combined with the alkaline material. Any of the known dehydrohalogenating materials may be used in this reaction, such as sodium and potassium hydroxide, sodium and potassium carbonates and bicarbonates, hydroxides or magnesium, zinc, lead, iron and aluminum, and the corresponding oxides, etc. The aluminates, silicates and zincates of alkali salts, such as sodium and potassium aluminate and sodium and potassium zincate, are particularly good dehydrohalogenating agents when used in substantially, or completely, non-aqueous media.

The amount of the dehydrohalogenating agent used will vary depending on the number of groups to be dehydrohalogenated. At least one mole of the agent should be employed for every halohydrin group to be converted to an epoxy group. Thus, if the halohydrin group on the condensation product of epichlorohydrin and cyclohexenol

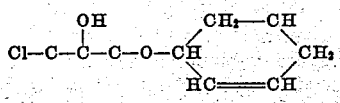

is to be converted to an epoxy group, the above product should be reacted with approximately 1 mole of the alkaline material.

In most cases, the dehydrochlorinating agent may be applied to the halohydrin as an aqueous solution or suspensions or dissolved in an inert solvent, such as ethers, esters, hydrocarbons, and the like. If the above-noted aluminates, silicates or zincates are used as the alkaline material, the dehydrohalogenation is preferably effected in a non-aqueous medium and the salts as by themselves or dissolved in organic solvents or diluents. 1,4-dioxane is particularly satisfactory as a solvent for this purpose.

The epoxidation of the polyethylenically unsaturated ether or the epoxy ether of the unsaturated cycloaliphatic alcohol may be advantageously carried out by reacting the ethers with an epoxidizing agent. Organic peracids, such as peracetic acid, perbenzoic acid, monoperphthalic acid and the like, are preferred agents for this reaction.

The amount of the epoxidizing agent employed will vary over a considerable range depending upon the type of product desired. In general, one should employ at least one mole of the oxidizing agent, such as described above, for every ethylenic group to be epoxidized. Thus, to produce glycidyl epoxycyclohexyl ether one should react one mole of glycidyl cyclohexenyl ether with approximately one mole of the epoxidizing agent. In some cases, it is rather difficult to effect epoxidation of all of the ethylenic groups and if a completely epoxidized product is required, additional epoxidizing agent and/or longer reaction periods may be required.

It is preferred to carry out the epoxidation reaction in a suitable mutual solvent for the reactants and product. Chloroform is an especially useful solvent for the purpose, but other materials, such as ethyl ether, dichloromethane, benzene, ethyl acetate, etc., and the like may be used. It is not necessary to operate under anhydrous conditions, but the amount of water present should be limited so as to avoid excessive hydrolysis of the epoxy group or groups. Up to 25% water in the reaction mixture may be tolerated.

The temperature employed during the epoxidation may vary over a considerable range depending upon the type of reactants and oxidizing agent selected. It is generally desirable to maintain the temperature between −10° C. to 60° C. and more preferably between 10° C. and 40° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration, and the like.

The polyepoxides of the present invention are water-white to slightly yellow colored liquids to solids. They have at least two epoxy groups per molecule and are substantially free of chlorine. As noted, the liquids have low viscosities and are generally soluble in most solvents, such as ketones, alcohols and liquid hydrocarbons, and are compatible with many synthetic oils and resins.

For certain applications, such as in the preparation of polymeric products, it is sometimes desirable to have high molecular weight products. Such products may be obtained by reacting the above-described new polyepoxides with polyhydric compounds. In this case, the polyhydric compound reacts with the vic-epoxy groups to form

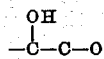

groups. High molecular weight products may be obtained from glycidyl epoxycyclohexyl ether, for example, by reacting X moles of that compound with one mole of a polyhydric phenol having X OH groups. Such products have the formula

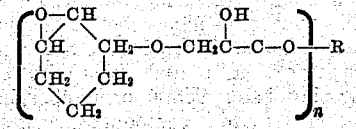

wherein R is the residue of the polyhydric phenol and n is an integer representing the number of OH groups on the polyhydric phenol molecule. Polyhydric compounds used for this purpose may be any polyhydric phenol, such as resorcinol, 2,2-bis(4-hydroxyphenyl)propane, catechol, hydroquinone, methyl resorcinol, 2,2-bis(4-hydroxyphenyl)butane and the like.

The condensation reaction described above for the preparation of the higher molecular weight products may be accomplished by merely heating the components together in the presence or absence of inert diluents. The condensation reaction is preferably accomplished at temperatures ranging from about 25° C. to 200° C. and more preferably from 150° C. to about 200° C.

If the resulting high molecular weight products possess less than the desired number of epoxy groups, such as may be the case when the polyhydric phenol is reacted with less than a double molar quantity of the new polyepoxides, additional epoxy groups may be introduced by reacting the higher molecular weight products with additional quantities of the epoxy-forming material, e.g., the epoxy-halo-alkanes, such that there will be one epoxy group for each of the OH groups of the polyhydric phenol to be reacted. Thus, if the higher molecular weight product was obtained by reacting one mole of glycidyl epoxycyclohexyl ether with two moles of the dihydric phenol, the resulting higher molecular weight product would then be reacted with approximately two moles of the epoxy-forming material. The halohydrin obtained may then be dehydrohalogenated according to conventional procedure.

The higher molecular weight products produced by the above methods vary from viscous liquids to solids having relatively high melting points. They possess active epoxy groups as well as hydroxyl groups and may be cured or undergo further reaction through either of these functional groups.

The new polyepoxides of the invention and their higher molecular weight products as described above may be cured through the epoxy groups to form valuable polymeric products. They may be polymerized alone or with other polyepoxide materials in a variety of different proportions, such as, for example, with amounts of other polyepoxides varying from 1% to 95% by weight. Polyepoxides that may be copolymerized with these products of the present invention include, among others, glycidyl polyethers of polyhydric phenols obtained by reacting polyhydric phenols, such as bis-phenol-A, resorcinol, and the like, with an excess of chlorohydrin, such as epichlorohydrin, polyepoxide polyethers obtained by reacting an alkane polyol, such as glycerol and sorbitol, with epichlorohydrin and dehydrohalogenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above-described polyepoxides. The glycidyl polyethers of polyhydric phenols obtained by condensing the polyhydric phenols with epichlorohydrin as described above are often referred to as "ethoxyline" resins. See Chemical Week, vol. 69, page 27, for September 8, 1951.

A more detailed description of these polyepoxides and their preparation may be found in U.S. 2,633,458.

A great variety of different curing agents may be employed in effecting the above-described homo- and copolymerization. Such agents include, among others, carboxylic acids or anhydrides, such as oxalic acid, phthalic acid, phthalic anhydride; Friedel-Crafts metal halides, such as aluminum chloride, zinc chloride, ferric chloride or boron trifluoride as well as complexes thereof with ethers, amines, acid anhydrides, ketones, diazonium salts, etc.; phosphoric acid and partial esters thereof including n-butyl ortho-phosphate, diethyl ortho-phosphate, hexaethyl tetraphosphate; amine compounds, such as triethylamine, ethylene diamine, diethylamine, diethylene triamine, triethylene tetraamine, dicyandiamide, melamine; and salts of inorganic acids, such as zinc fluoborate, potassium persulfate, nickel fluoborate and magnesium perchlorate.

The amount of the curing agents employed may vary over a considerable range depending upon the agent selected. With curing agents having replaceable hydrogen, such as the amine curing agents, amounts of agent employed vary up to and including equivalent proportions, i.e., sufficient curing agent to furnish a replaceable hydrogen atom for every epoxy group to be reacted. In most cases, satisfactory cures are obtained with from .7 to 1 equivalent of the curing agent per equivalent of epoxy compound.

Other curing agents, such as metal salts, are employed in amounts varying from about 1% to about 20%, and more preferably from about 3% to 20%.

The cure of the polyepoxides is preferably effected by mixing the curing agent with the polyepoxide and then heating. The temperature selected will vary with the curing agent. Active curing agents, such as the amines may be utilized, for example, at lower temperatures, such as from room temperature to about 60° C. Less active materials, such as polybasic anhydrides and acids, generally require higher temperatures, such as temperatures ranging from about 60° C. to 150° C. Aromatic amines are preferably employed at the higher temperatures, e.g., temperatures ranging from about 60° C. to 150° C.

If the new polyepoxides or their higher molecular weight derivatives are to be used in the preparation of castings or pottings, the curing agent and the epoxy material are generally combined together and then poured into the mold or casting which may if desired contain additional material, such as electrical wires, apparatus, etc., and the mixture then heated to effect the cure.

The new polyepoxides and their higher molecular weight derivatives may also be employed with the aforedescribed curing agents to prepare improved surface coating compositions of the air-drying or baking type. In utilizing the products for this application, it is generally desirable to combine the epoxy material and the curing agent with the desired solvents, and, if desired, other film-forming materials and driers, and then apply the resulting mixture to the surface to be coated. Film-forming materials that can be used with the epoxy material in this manner include the drying oils, such as tung oil, linseed oil, dehydrated castor oil, soyabean oil, and the like; cellulose derivatives such as cellulose nitrate, cellulose acetate, cellulose acetate butyrate, cellulose propionate, ethyl cellulose, and the mixtures thereof; and vinyl polymers, such as polymers of vinyl chloride, vinylidene chloride, methyl methacrylate, diallyl phthalate, and the like. The coatings prepared in this manner may be allowed to set to a hard finish at room temperature or heat may be applied to hasten the cure.

The higher molecular weight hydroxy-containing derivatives of the new polyepoxides as described above are particularly suited for use in preparing coating compositions as described above, as they may be reacted through the hydroxyl group or groups with drying oil fatty acids or may be cured through the hydroxyl groups with compounds, such as methylol ureas, methylol phenols, diisocyanates, and the like.

The new polyepoxides and their higher molecular weight derivatives may also be employed with the curing agents to prepare valuable adhesive and impregnating compositions. In utilizing the products for these applications, it is generally desirable to combine the epoxy material with suitable solvents or diluents, such as benzene, toluene, acetonitrile, and the like, so as to form a spreadable fluid and then the curing agent added and the mixture applied to the desired surface.

In addition to their use in forming the above-described polymeric products, the new polyepoxides and their higher molecular weight derivatives may be used as stabilizing agents for various halogen-containing polymers, and particularly the vinyl halide polymers. These products are compatible with the polymers and in combination therewith give good resistance to discoloration by heat and light. These products may be used as stabilizers, alone or in combination with other stabilizing agents, such as urea and thiourea derivatives. In most cases, the products are effective as stabilizers in amounts varying from about .1% to 5% by weight of the polymer being stabilized. The epoxy material may be combined with the halogen-containing polymer by any suitable method, such as by dissolving the products in a suitable solvent or by milling the products together in a suitable roll mill.

To illustrate the manner in which the invention may be carried out, the following examples are given. It is to be understood that the examples are for the purpose of illustration and the invention is not to be regarded as limited to any of the specific compounds or conditions recited therein. Unless otherwise specified, parts disclosed in the examples are parts by weight.

*Example I*

This example illustrates the preparation and some of the properties of 2,3-epoxypropyl 2,3-epoxycyclohexyl ether.

40 parts of 2,3-epoxypropyl 2-cyclohexyl ether prepared from epichlorohydrin and cyclohexenol was added to 200 parts of chloroform. The mixture was cooled to 5° C. 51 parts of a 45% peracetic acid solution was added thereto. After holding at 5° C. for 1 hour, the temperature was raised to about 20° C. and held there for 48 hours. The reaction mixture was then extracted with water, sodium carbonate, water and then filtered and dried. Chloroform was then taken off and the product distilled to yield a white free flowing liquid having 0.06 poise viscosity at 25° C., a boiling point of 93–99° C./2 mm., $n$ 25/D 1.4747 and epoxy value of 1.13 eq./100 g. The product was 2,3-epoxypropyl 2,3-epoxycyclohexyl ether having the structure

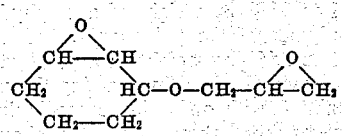

100 parts of the polyepoxide prepared above was also mixed with 32 parts of meta-phenylene diamine and the mixture heated to 150° C.–160° C. for 4 hours. The resulting product was a hard casting having an exceptional high hot hardness value. The hardness values at various temperatures as compared to those obtained from casting made by heating diglycidyl ether of 2,2-bis(4-hydroxyphenyl)propane with 12.5% meta-phenylene diamine for 2 hours at 100° C. and 30 minutes at 250° C. are shown in the table below:

| Polyepoxide | 25° C. | 80° C. | 120° C. | 145° C. | 165° C. |
| --- | --- | --- | --- | --- | --- |
| 2,3-epoxypropyl 2,3-epoxycyclohexyl ether | 49 | 39 | 25 | 19 | 17 |
| diglycidyl ether of 2,2-bis(4-hydroxyphenyl)propane | 37 | 21 | 6 | 0 | 0 |

The product was also resistant to water, alkali and solvents.

100 parts of 2,3-epoxypropyl 2,3-epoxycyclohexyl ether was mixed with 95 parts of hexahydrophthalic anhydride and 1 part of benzyldimethylamine and the mixture maintained at 100° C. for several hours. The resulting product was a hard casting having good resistance to water, alkali and solvents.

100 parts of the polyepoxide was mixed with 190 parts hexahydrophthalic anhydride, warmed and stirred in 2 parts triphenyl-phosphine. The mixture was kept at 100° C. for ½ hour and the mixture then gelled. After 2 hours a pale yellow, hard casting was obtained.

*Example II*

This example illustrates the preparation and some of the properties of 2,3-epoxypropyl 2,3-epoxycyclopentyl ether.

100 parts of 2,3-epoxypropyl 2-cyclopentyl ether prepared from epichlorohydrin and cyclopentenol was added to 400 parts of chloroform. 150 parts of 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a water white free flowing liquid identified as 2,3-epoxypropyl 2,3-epoxycyclopentyl ether having the structure:

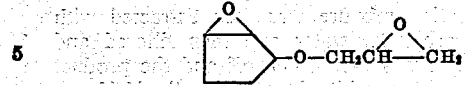

This product could be cured with meta-phenylene diamine and hexahydrophthalic anhydride in the same manner as shown for 2,3-epoxypropyl 2,3-epoxycyclohexyl ether in Example I.

*Example III*

This example illustrates the preparation and some of the properties of 2,3-epoxypropyl (2,3-epoxycyclohexyl)methyl ether.

20 parts of 2,3-epoxypropyl 2-cyclohexenylmethyl ether prepared by reacting tetrahydrobenzyl alcohol with epichlorohydrin was added to 100 parts of chloroform. 30 parts of a 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a water white free flowing liquid. The product was identified as 2,3-epoxypropyl (2,3-epoxycyclohexyl)methyl ether.

100 parts of the polyepoxide prepared above was mixed with 9 parts of diethylene triamine and the mixture maintained at 85° C. for several hours. The resulting product was a hard casting having good resistance to water, alkali and solvents.

100 parts of the polyepoxide prepared above was also mixed with 25 parts of meta-phenylene diamine and the mixture heated to 150° C. for several hours. The resulting product was a hard casting having a high hot hardness value. The product was also resistant to water, alkali and solvents.

100 parts of 2,3-epoxypropyl (2,3-epoxycyclohexyl) methyl ether was mixed with 90 parts of hexahydrophthalic anhydride and 1 part of benzyldimethylamine and the mixture maintained at 100° C. for several hours. The resulting product was a hard casting having good resistance to water, alkali and solvents.

*Example IV*

This example illustrates the preparation and some of the properties of the di(2,3-epoxycyclohexyl) ether of ethylene glycol.

25 parts of di(2-cyclohexyl) ether of ethylene glycol produced by reacting 2-cyclohexenyl chloride with ethylene glycol in the presence of caustic was added to 150 parts of chloroform. 50 parts of a 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a water white liquid identified as di(2,3-epoxycyclohexyl) ether of ethylene glycol.

This polyepoxide could be cured with hexahydrophthalic anhydride, phthalic anhydride, dichloromaleic anhydride and chlorendic anhydride in the presence of 1% benzyldimethylamine to form hard chemical resistant castings.

*Example V*

This example illustrates the preparation and some of the properties of 2,3-epoxypropoxyethyl 2,3-epoxycyclohexyl ether.

70 parts of 2,3-epoxypropoxyethyl 2-cyclohexenyl ether (obtained by reacting 1 mole of 2-cyclohexenyl chloride with 1 mole of ethylene glycol and then reacting that product with epichlorohydrin) was added to 300 parts of chloroform. 200 parts of a 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a water white free flowing liquid identified as 2,3-epoxypropoxyethyl 2,3-epoxycyclohexyl ether.

This product could be cured with diethylene triamine, meta-phenylene diamine and hexahydrophthalic anhydride in the same manner as shown for 2,3-epoxypropyl 2,3-epoxycyclohexyl ether in Example I.

*Example VI*

This example illustrates the preparation and some of the properties of di(2,3-epoxycyclohexyl) ether.

55 parts of di(2-cyclohexenyl) ether obtained by reacting 2-cyclohexenyl chloride with sodium hydroxide was added to 195 parts of chloroform. 72 parts of 45% peracetic acid solution was then added to the mixture and the resulting mixture maintained at 30° C. for 2 hours and then allowed to stand in a water bath at 27° C. for 12 hours. The reaction mixture was then extracted with water, sodium carbonate, water and then filtered and dried. Chloroform was then taken off and the product distilled to yield a water white liquid identified as di(2,3-epoxycyclohexyl) ether.

100 parts of the polyepoxide prepared above was mixed with 25 parts of hexahydrophthalic anhydride and 1 part of benzyldimethylamine and the mixture maintained at 100° C. for several hours. The resulting product was a hard casting having good resistance to water, alkali and solvents.

Related cured products are obtained by replacing the hexahydrophthalic anhydride with equivalent amounts of each of the following: phthalic anhydride, dichlorosuccinic anhydride, chlorendic anhydride and pyromellitic anhydride.

*Example VII*

Two moles of 2,3-epoxypropyl 2,3-epoxycyclohexyl ether produced in Example I was combined with 1 mole of 2,2-bis(4-hydroxyphenyl)propane and the mixture heated at 150° C. for several hours. The resulting product was a soft solid which could be subsequently cured with amines to form a hard solid casting.

I claim as my invention:

1. A polyepoxide which is an ether of (1) an alcohol selected from the group consisting of monocyclic monohydric vic-epoxy-substituted cycloalkanols and cycloalkylalkanols containing from 5 to 7 carbons in the ring wherein the oxirane oxygen is substituted on the nucleus and (2) a vic-epoxy-substituted monohydric alkanol of at least 3 carbons wherein the oxirane oxygen is terminally situated.

2. A polyepoxide which is an ether of (1) a monocyclic monohydric vic-epoxy-substituted cycloalkanol having from 5 to 7 carbon atoms in the ring and (2) a vic-epoxy-substituted monohydric alkanol of at least 3 carbons wherein the oxirane oxygen is terminally positioned.

3. A polyepoxide which is an ether of (1) a vic-epoxy-substituted cyclohexanol and (2) a vic-epoxy-substituted monohydric alkanol having from 3 to 12 carbon atoms wherein the oxirane oxygen is terminally situated.

4. A polyepoxide which is an ether of (1) monocyclic monohydric vic-epoxy-substituted cycloalkylalkanol having from 5 to 7 carbons in the ring and wherein the epoxy-oxygen is directly attached to the ring and (2) a monohydric vic-epoxy-substituted alkanol having from 3 to 12 carbons wherein the epoxy-oxygen atom is terminally situated.

5. A monocyclic vic-epoxycycloalkyl ether of a monohydric vic-epoxyalkanol of 3 to 12 carbon atoms, wherein the vic-epoxycycloalkyl group contains from 5 to 7 carbons and the epoxy-oxygen in said vic-epoxyalkanol is terminally positioned.

6. A monocyclic vic-epoxycylohexyl ether of a vic-epoxy-substituted monohydric alkanol of 3 to 12 carbons wherein the epoxy-oxygen of said alkanol is terminally situated.

7. A 2,3-epoxypropyl ether of a monocyclic monohydric vic-epoxy-substituted cycloalkanol having from 5 to 7 carbons in the ring.

8. 2,3-epoxypropyl ether of 2,3-epoxycyclohexanol.

9. 2,3-epoxypropyl ether of 2,3-epoxycyclopentanol.

10. 2,3-epoxypropyl ether of 2,3-epoxycyclohexylmethanol.

11. The polymer of the polyepoxide defined in claim 1 and from 1 to 95% by weight of a polyhydric phenol.

12. The polymer of the polyepoxide defined in claim 3 and from 1 to 95% by weight of a polyhydric phenol.

13. The polymer obtained by reacting the polyepoxide defined in claim 3 with an amine cross-linking agent at a temperature of from about 20° C. to about 250° C., said cross-linking agent being present in a sufficient amount to provide a replaceable hydrogen atom for substantially every epoxy group reacted.

14. The polymer obtained by reacting the polyepoxide defined in claim 4 with an acid anhydride in admixture with a tertiary amine catalyst at a temperature of from about 20° C. to about 250° C., said acid anhydride being present in a sufficient amount to provide a replaceable hydrogen atom for substantially every epoxy group reacted.

15. The copolymer of 2,3-epoxypropyl ether of 2,3-epoxycyclohexanol and from 1 to 95% by weight of a polyhydric phenol.

16. The process for producing a monocyclic vic-epoxycycloalkyl ether of a monohydric vic-epoxy alkanol wherein the vic-epoxycycloalkyl group contains from 5 to 7 carbons and the epoxy-oxygen in said vic-epoxy alkanol is terminally positioned, which comprises reacting a monocyclic alkenyl ether of a vic-epoxy alkanol in which the epoxy-oxygen is terminally positioned and wherein the alkenyl ring contains from 5 to 7 carbons, with a peracid in admixture with an inert organic solvent at a temperature of from about −10° C. to about 60° C., at least one mole of said peracid being present for every ethylenic group to be epoxidized.

17. The homopolymer of the polyepoxide defined in claim 1.

18. The homopolymer of the polyepoxide defined in claim 2.

References Cited in the file of this patent

UNITED STATES PATENTS

| | | |
|---|---|---|
| 2,543,416 | Niederhauser | Feb. 27, 1951 |
| 2,553,718 | Neway et al. | May 22, 1951 |
| 2,642,412 | Newey et al. | June 16, 1953 |
| 2,739,161 | Carlson | Mar. 20, 1956 |